United States Patent
Horne Curimbaba Ferreira

(10) Patent No.: US 8,669,198 B2
(45) Date of Patent: Mar. 11, 2014

(54) BASIC REFRACTORIES COMPOSITION CONTAINING MAGNESIUM ORTHOTITANATE AND CALCIUM TITANATE, PROCESS FOR ITS PRODUCTION AND USES THEREOF

(75) Inventor: Luís Leonardo Horne Curimbaba Ferreira, Poços de Caldas (BR)

(73) Assignee: Elfusa Geral de Electgrofusao Ltda, Sao Joao da boa Vista-SP (BR)

(*) Notice: Subject to any disclaimer, the term of this patent is extended or adjusted under 35 U.S.C. 154(b) by 1093 days.

(21) Appl. No.: 12/523,881

(22) PCT Filed: Oct. 31, 2007

(86) PCT No.: PCT/BR2007/000291
§ 371 (c)(1),
(2), (4) Date: Oct. 12, 2009

(87) PCT Pub. No.: WO2008/089530
PCT Pub. Date: Jul. 31, 2008

(65) Prior Publication Data
US 2010/0062386 A1    Mar. 11, 2010

(30) Foreign Application Priority Data
Jan. 24, 2007 (BR) .................................... 0700120

(51) Int. Cl.
C04B 35/03    (2006.01)
C04B 35/04    (2006.01)
C04B 35/44    (2006.01)
C04B 35/00    (2006.01)

(52) U.S. Cl.
USPC ........................... 501/108; 501/121; 501/136

(58) Field of Classification Search
USPC .......... 501/101, 108, 121, 123, 134, 135, 136
See application file for complete search history.

(56) References Cited

U.S. PATENT DOCUMENTS

| | | | | |
|---|---|---|---|---|
| 3,298,841 A | * | 1/1967 | Havranek | 501/108 |
| 3,540,898 A | * | 11/1970 | Kreglo, Jr. | 501/108 |
| 5,344,802 A | * | 9/1994 | Knauss | 501/120 |

FOREIGN PATENT DOCUMENTS

| | | |
|---|---|---|
| DE | 195 22 665 | 1/1996 |
| JP | 9 020550 | 1/1997 |
| JP | 2004 161542 | 6/2004 |

OTHER PUBLICATIONS

Search Report and Written Opinion for PCT/BR2007/000291 dated Jun. 11, 2008.
International Preliminary Report on Patentability dated Apr. 28, 2009.

* cited by examiner

*Primary Examiner* — Noah Wiese
(74) *Attorney, Agent, or Firm* — Alston & Bird LLP

(57) ABSTRACT

The present invention relates to a basic-refractory composition containing magnesium orthotitanate ($Mg_2TiO_4$) and calcium titanate ($CaTiO_3$) suitable for use in rotating kilns for the production of Portland cement or lime.

14 Claims, 2 Drawing Sheets

BASIC REFRACTORIES COMPOSITION CONTAINING MAGNESIUM ORTHOTITANATE AND CALCIUM TITANATE, PROCESS FOR ITS PRODUCTION AND USES THEREOF

The present invention relates to a composition for basic-refractory containing magnesium orthotitanate ($Mg_2TiO_4$) and calcium titanate ($CaTiO_3$), particularly suitable for use in rotating kilns for the production of Portland cement or lime.

Refractory materials based on magnesia-chromite, magnesia, magnesia-spinel, calcia, dolomite and magnesia-carbon are widely employed as compositions of basic refractories. However, none of theses compositions proves to be totally suitable for use in rotating kilns for the production of Portland cement or lime.

Magnesia-chromite bricks were used during a number of years in cement-kiln burning zones, since they had good mechanical strength, corrosion resistance, structural stability, resistance to damage caused by thermal shock, resistance to hydration, low heat conductivity, protective gluing and low cost due to the raw materials used in manufacturing them. However, great environmental pressures have led to gradual replacement of magnesia-chromite bricks by other chrome-free technologies, since in contact with alkaline salts the trivalent chromium ion becomes hexavalent, thus becoming harmful to health (carcinogenic) and to the environment.

Magnesian refractories, in turn, exhibit low reactivity with respect to the phases of the Portland cement clinker. On the other hand, they exhibit high heat conductivity, impairing the thermal efficiency of the system. They exhibit high thermal expansion and low resistance to damage caused by thermal shock.

Magnesia-spinel refractories were introduced in the cement industry in the Eighties by virtue of the success proven in the Japanese iron-and-steel industry. Although they exhibit an excellent resistance to damage caused by thermal shock and low heat conductivity, magnesia-spinel refractories show instable protective gluing, which makes it difficult to use them in cement kiln burning zones. An alternative for overcoming this problem is to add zirconia to the system, which even in small amounts improves the gluing characteristics, since, in contact with calcium silicate phases of the cement, formation of calcium zirconate and mervinite ($Ca_3MgSi_2O_8$) occurs, which enable the formation of protective gluing, as described by Radovanovic S.V.; "Reaction Behavior of Spinel, Zirconia and Monocalcium Zirconate under Working Conditions of Cement Kilns". Proceedings of UNITECR '97, 1613-1623, 1997.

U.S. Pat. No. 6,261,983 describes adding zirconia by incorporating electromolten alumina-zirconia grains below 150 mesh in a refractory material. This addition may range from 0.5 to 10% by weight and provides the refractory with 0.1 to 5% by weight of zirconia. The refractory produced in the conditions described in that patent exhibit greater resistance to cracking and to chemical attack.

In addition to the technology of adding zirconia to magnesia-spinel bricks, a prior-art process is known from U.S. Pat. No. 5,171,724 wherein a magnesia-alumina spinel aggregate with addition of iron oxide ($Fe_2O_3$) between 1.6 and 10% and titanium oxide between 0.5 and 3% is produced and incorporated into a refractory formulation. The incorporation of iron and titanium oxides into the refractory promotes the improvement in the performance of the product when used in the cement kiln burning zone. Values higher than 3% of titanium oxide promote the formation of aluminum titanate with increase in porosity. On the other hand, iron oxide ($Fe_2O_3$) at amounts higher than 10% makes it difficult to densify the aggregate and provides rapid dissolution thereof when in contact with the phases of Portland cement clinker.

The incorporation of titanium oxide into magnesia-alumina aggregates has already been investigated and described in a few other prior-art documents, as for instance, JP 59-141461, which describes the production of an aggregate containing magnesia, alumina and titania.

Makino and co-workers (Makino, H; Mori, M; Obana, T; Nakamoto, K & Tsuchinary, A; "The Application of MgO—$TiO_2$—$Al_2O_3$ Aggregates for Chrome-Free Refractories", Journal of the Technical Association of Refractories, Japan, 24 [4], 295-2005) also evaluated compositions of the magnesia-alumina-titania system for cement-kiln refractories as possible substituents for refractories based on chromite and spinel. The results showed resistance to damage caused by thermal shock higher than that of magnesia-chromite refractories, but lower than that of magnesia-spinel refractories. Samples of the refractories of the magnesia-alumina-titania system that were reacted with Portland cement clinker with addition of 10% calcium sulfate showed results superiors to magnesia-spinel refractories and quite similar to magnesia-chromite refractories.

U.S. Pat. No. 5,595,948 describes a refractory of the magnesia-magnesium orthotitanate ($Mg_2TiO_4$) system, wherein the microstructure formed has magnesia grains bonded to each one another by a magnesium orthotitanate phase. The magnesium orthotitanate can be obtained by in-situ reaction between magnesia and titanium oxide or previously obtained by sintering magnesia and titanium oxide. In the second case, the sintered product is finely ground and mixed with magnesia aggregates. The refractory described in this patent exhibits an excellent resistance to cracking and to erosion in basic atmospheres and high thermal and mechanical stability at high temperatures.

However, most of the studies already known from prior art comprise the incorporation of alumina to the system which yields to the formation of aluminum titanate or magnesia-alumina spinel. In both cases the alumina reacts with the calcia present in the Portland cement clinker thus forming calcium aluminates that impart the formation of stable gluing in the refractory.

SUMMARY OF THE INVENTION

The present invention relates to a basic-refractory composition comprising from 0.5 to 15% by weight of magnesium orthotitanate ($Mg_2TiO_4$), from 0.5 to 15% by weight of calcium titanate ($CaTiO_3$) and from 70 to 99% by weight of magnesia, dolomite or mixtures thereof, all the percentages being based on the total weight of the composition.

The present invention also relates to a process for preparing a basic refractory composition as described above and to the use thereof in kilns for the production of Portland cement or for the production of lime.

DETAILED DESCRIPTION OF THE INVENTION

Figure 1:
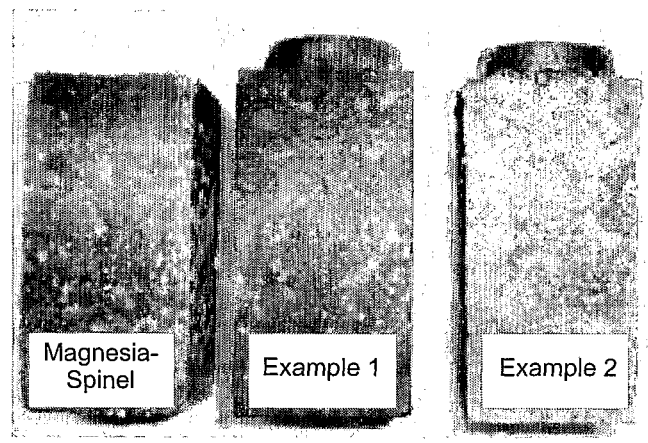
FIG. 1 is a photograph showing the gluing obtained by refractory materials according to the present invention and the absence of gluing in conventional magnesia-spinel refractories.

The present invention relates to a basic-refractory composition containing from 0.5 to 15% by weight of magnesium orthotitanate ($Mg_2TiO_4$), from 0.5 to 15% by weight of calcium titanate ($CaTiO_3$) and from 70 to 99% by weight of magnesia, dolomite or mixtures thereof, all the percentages being based on the total weight of the composition. Magnesia and dolomite may be used either separately or jointly at different proportions.

The refractory composition of the present invention permits a significant reduction of alumina of the system (alumina, if present, occurs in the form of impurity), besides permitting the use of magnesium orthotitanate ($Mg_2TiO_4$). This magnesium orthotitanate phase, when in contact with calcium silicate phases, promotes the formation of calcium titanate, magnesia, di-calcium silicate and mervinite ($Ca_3MgSi_2O_8$), according to reactions (1) and (2) below:

$$Mg_2TiO_5 + Ca_3SiO_5 \rightarrow CaTiO_3 + 2MgO + Ca_2SiO_4 \quad (1)$$

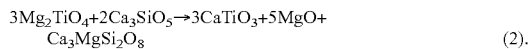

$$3Mg_2TiO_4 + 2Ca_3SiO_5 \rightarrow 3CaTiO_3 + 5MgO + Ca_3MgSi_2O_8 \quad (2).$$

The formation of these phases guarantees a stable protective gluing in the refractory bricks used in the cement kiln burning zone. In addition to magnesium orthotitanate ($Mg_2TiO_4$), the refractory composition must also contain calcium titanate ($CaTiO_3$), so as to control the thermal expansion coefficient of the refractory. The calcium titanate phase is virtually inert to the Portland cement clinker and has an expansion coefficient of $14.1 \times 10^{-6}$ °$C.^{-1}$, which is higher than that of the $Mg_2TiO_4$ phase ($10.0 \times 10{-6}$ °$C.^{-1}$). Thus, any expansion coefficient between $10.0 \times 10^{-6}$ and $14.1 \times 10^{-6}$ °$C.^{-1}$ can be obtained by means of an adequate proportion of the magnesium-orthotitanate and calcium-titanate phases. Therefore, one of the crucial aspects of the present invention was to conclude that the addition of calcium titanate together with magnesium orthotitanate to a magnesia base material, in determined specific amounts, enables the adjustment of the expansion coefficient. Magnesian refractories have expansion coefficient on the order of $13.5 \times 10^{-6}$ °$C.^{-1}$ and the presence of magnesium orthotitanate in the system raises the expansion coefficient to values between $10 \times 10^{-6}$ °$C.^{-1}$ and $13.5 \times 10^{-6}$ °$C.^{-1}$. The addition of calcium titanate, with expansion coefficient on the order of $14.1 \times 10^{-6}$ °$C.^{-1}$ provides suitability of the coefficients of the aggregates containing magnesia, magnesium orthotitanate and calcium titanate with the refractories matrix, thus improving their properties.

Besides the stable protective gluing, the refractories obtained in accordance with the present invention also exhibit an excellent resistance to damage caused by thermal shock, comparable to that of refractories of the magnesia-spinel system known from the prior art.

In order to prepare the refractory composition according to an embodiment of the present invention, said magnesium orthotitanate ($Mg_2TiO_4$) and calcium titanate ($CaTiO_3$) phases are added in combination with magnesia (MgO) in the form of electromolten aggregates, that is to say, an electromolten aggregate containing $Mg_2TiO_4$, $CaTiO_3$ and MgO. The amount of magnesium orthotitanate ($Mg_2TiO_4$) ranges from 8% to 92% by weight in the aggregate, whereas the amount of calcium titanate ($CaTiO_3$) may range from 1 to 80% by weight in the aggregate. These aggregates contain a periclase phase (MgO) in their composition, completing the weight percentage of the aggregate, excluding the impurities. The other parameters and conditions of the process for preparing the refractory composition of the present invention are those conventionally used for this type of material.

The refractory composition of the present invention may contain impurities such as $SiO_2$, $Fe_2O_3$, $Na_2O$, $K_2O$ and $Al_2O_3$ in total amounts lower than 4%, preferably lower than 2% by weight, based on the total weight of the refractory. The composition may also contain zirconia ($ZrO_2$), either in the free form or in combination, in an amount lower than 5%, preferably lower than 2% by weight, based on the total weight of the refractory.

The refractory composition may further contain magnesia-alumina spinel, but in proportions lower than 2% by weight, preferably lower than 1% by weight, based on the total weight of the refractory.

The present invention will now be better illustrated in in the examples given hereinafter. However, the data and procedures illustrated below merely refer to some embodiments of the invention and should not be taken as being limitative of its scope.

EXAMPLE 1

A refractory was produced, containing chiefly magnesia and about 1.0% of magnesia-alumina spinel and 0.7% of magnesium orthotitanate added by means of an electro molten aggregate containing in its composition magnesium orthotitanate, magnesia (69%) and calcium titanate (24%). The refractory had 92.3% magnesia in its composition and 1.73% content of $Fe_2O_3$, $SiO_2$, $Na_2O$ and $K_2O$. The calcia content in said refractory was determined as 2.31% and was entirely combined in the form of calcium titanate.

Figure 2:
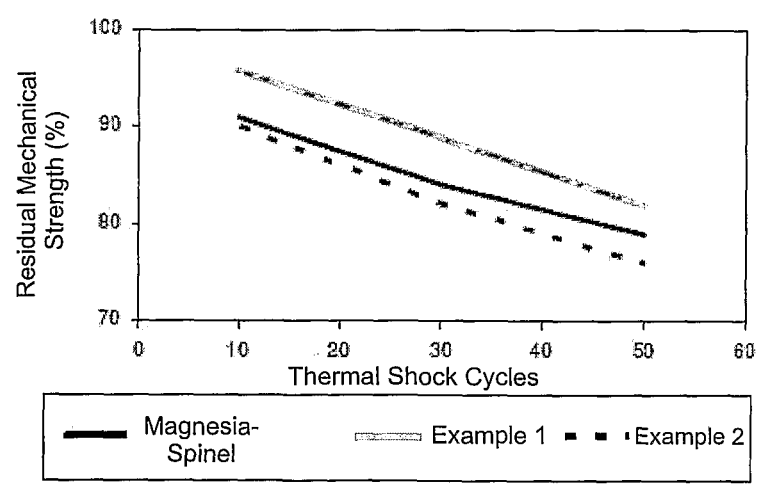
FIG. 2 shows a comparative graph with curves of residual mechanical strength versus different thermal-shock cycles among refractory compositions of the present invention and a conventional magnesia-spinel brick.

Assays for the existence of damage caused by thermal shock showed a behavior similar to those observed in magnesia spinel refractory. The refractory also exhibited protective gluing as can be seen in FIG. 2 after 2 burning cycles at 1450° C. for 20 hours when contacted with a pressed tablet of Portland cement clinker of the composition presented in table I below.

TABLE I

| Chemical composition of Portland cement clinker used (percentage values) | | | | | | | |
|---|---|---|---|---|---|---|---|
| $SiO_2$ | $TiO_2$ | $Fe_2O_3$ | $Al_2O_3$ | CaO | MgO | $N_2O$ | $K_2O$ |
| 19.7 | 0.33 | 3.41 | 5.12 | 62.3 | 8.00 | 0.27 | 0.90 |

EXAMPLE 2

A refractory was manufactured containing chiefly 85.8% of magnesia, 1.5% of magnesia-alumina spinel and 5.5% of magnesium orthotitanate by means of an electromolten aggregate containing in its composition magnesium orthotitanate and calcium titanate (50% each). The refractory exhibited 1.86% content of $Fe_2O_3$, $SiO_2$, $Na_2O$ and $K_2O$. The calcia content in the refractory was determined at 3.26% and was entirely combined, forming calcium titanate.

COMPARATIVE EXAMPLES

An assay for gluing effected in the same conditions described in example 1 showed strong adhesion of the Portland cement tablet with the refractory, as can be seen from the comparative photographs presented in FIG. 1, in which one can observe the reaction with Portland cement clinker showing gluing in the refractories of examples 1 and 2 and the absence of gluing in the magnesia-spinel refractory.

An assay for resistance to damage caused by thermal shock was also carried out with samples prepared in accordance with examples 1 and 2 in comparison with magnesia-spinel refractories. This assay showed that the products obtained in accordance with the present invention exhibited characteristics similar to those of magnesia-spinel refractories, as can be observed from the curves of residual strength versus different thermal shock cycles, shown in FIG. 2. The curves for the formulations described in examples 1 and 2 are compared with a curve of a standard magnesia-spinel brick tested under the same conditions.

Figure 3:
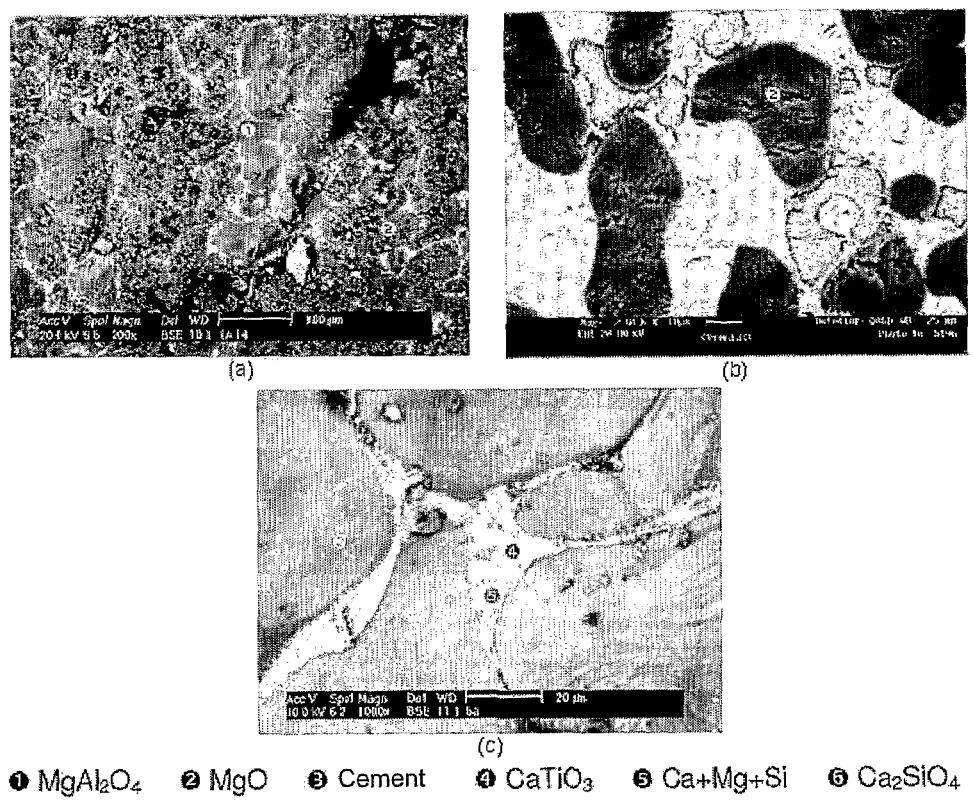
FIG. 3 shows photographs of microscopy analysis associated to EDS of refractory materials according to the present invention and of conventional magnesia-spinel material.

FIG. 3 shows results of microscopy analysis associated to the EDS, which reveals the presence of the reaction products foreseen in equations (1) and (2) mentioned above in the region reacted with Portland cement clinker. The micrographs of FIG. 3 refer to (a) magnesium-spinel, (b) product obtained according to example 1 and (c) product obtained according to example 2, after reaction at 1450° C. for 40 hours with Portland cement clinker.

Standard magnesia-spinel refractories showed the presence of calcium aluminate phases that form liquids at temperatures lower than 1450° C., thus making the formation of a protective gluing as presently obtained with the composition of the present invention impossible.

The invention claimed is:

1. A basic-refractory composition, characterized by comprising from 0.5 to 15% by weight of magnesium orthotitanate ($Mg_2TiO_4$), from 0.5 to 15% by weight of calcium titanate ($CaTiO_3$) and from 70 to 99% by weight of magnesia, or dolomite or mixtures thereof, all the percentages being based on the total weight of the composition, wherein the magnesium-orthotitanate ($Mg_2TiO_4$) and calcium titanate ($CaTiO_3$) phases are present in the form of electromolten aggregates.

2. A basic-refractory composition according to claim 1, characterized in that the magnesium-orthotitanate ($Mg_2TiO_4$) and calcium titanate ($CaTiO_3$) phases are present in the form of a combined electromolten aggregate containing ($Mg_2TiO_4$) and ($CaTiO_3$), the amount of magnesium orthotitanate ($Mg_2TiO_4$) ranging from 8% to 92% by weight, based on the weight of the aggregate, and the amount of calcium titanate ranges from 1 to 80% by weight, based on the weight of the aggregate.

3. A basic-refractory composition according to claim 2, characterized in that said aggregates contain a periclase (MgO) phase.

4. A basic-refractory composition according to claim 3, characterized in that said periclase (MgO) phase is present as a phase complementary to magnesium orthotitanate and to calcium titanate.

5. A basic-refractory composition according to claim 1, characterized by containing impurities of $SiO_2$, $Fe_2O_3$, $Na_2O$, $K_2O$ and $Al_2O_3$ in total amounts lower than 4% by weight, based on the total weight of the refractory.

6. A basic-refractory composition according to according to claim 5, characterized in that said impurities are present in amounts lower than 2% by weight, based on the total weight of the refractory.

7. A basic-refractory composition according to claim 1, characterized by comprising zirconia ($ZrO_2$) in free or combined form in an amount lower than 5% based on the total weight of the refractory.

8. A basic-refractory composition according to claim 7, characterized by containing zirconia ($ZrO_2$) in free or combined form in an amount lower than 2% by weight, based on the total weight of the refractory.

9. A basic-refractory composition according to claim 1, characterized by comprising magnesia-alumina spinel in an amount lower than 2% by weight, based on the total weight of the refractory.

10. A basic-refractory composition according to claim 9, characterized in that the amount of magnesia-alumina spinel is lower than 1% by weight, based on the total weight of the refractory.

11. A method, comprising: providing kiln including a basic-refractory composition as defined in claim 1 and producing Portland cement with said kiln.

12. A methods, comprising: providing a kiln including a basic-refractory composition as defined in claim 1 and producing lime with said kiln.

13. A process for preparing a basic-refractory composition, comprising: the steps of:
   a) providing a magnesian or dolomitic matrix;
   b) adding magnesium orthotitanate ($Mg_2TiO_4$) and calcium titanate ($CaTiO_3$) to said magnesian or dolomitic matrix, the magnesium orthotitanate and the calcium titanate being added in the form of electromolten aggregates, said aggregates also containing magnesia too in the composition;
   said composition comprising from 0.5 to 15% by weight of magnesium orthotitanate (Mg2TiO4), from 0.5 to 15% by weight of calcium titanate (CaTiO3) and from 70 to 99% by weight of magnesia, or dolomite or mixtures thereof, all the percentages being based on the total weight of the composition, wherein the magnesium-orthotitanate (Mg2TiO4) and calcium titanate (CaTiO3) phases are present in the form of electromolten aggregates.

14. A kiln for the production of Portland cement or lime, characterized by containing, as a basic refractory coating, a composition as defined in claim 1.

* * * * *

UNITED STATES PATENT AND TRADEMARK OFFICE
CERTIFICATE OF CORRECTION

| | |
|---|---|
| PATENT NO. | : 8,669,198 B2 |
| APPLICATION NO. | : 12/523881 |
| DATED | : March 11, 2014 |
| INVENTOR(S) | : Luis Leonardo Horne Curimbaba Ferreira |

It is certified that error appears in the above-identified patent and that said Letters Patent is hereby corrected as shown below:

ON THE TITLE PAGE:

In item (73), delete "Elfusa Geral de Electgrofusao Ltda" and insert --ELFUSA GERAL DE ELETROFUSAO LTDA-- therefor.

In item (30), delete "0700120" and insert --PI0700120-- therefor.

Signed and Sealed this
Twelfth Day of August, 2014

Michelle K. Lee
*Deputy Director of the United States Patent and Trademark Office*